(12) United States Patent
Obi (10) Patent No.: US 8,076,400 B2
(45) Date of Patent: Dec. 13, 2011

(54) MATERIAL COMPOSITION AND OPTICAL ELEMENTS USING THE SAME

(75) Inventor: Kunihisa Obi, Shibuya-ku (JP)

(73) Assignee: Olympus Corporation, Tokyo (JP)

( * ) Notice: Subject to any disclaimer, the term of this patent is extended or adjusted under 35 U.S.C. 154(b) by 153 days.

(21) Appl. No.: 12/387,678

(22) Filed: May 5, 2009

(65) Prior Publication Data

US 2009/0292070 A1 Nov. 26, 2009

(30) Foreign Application Priority Data

May 23, 2008 (JP) ................................ 2008-135539

(51) Int. Cl.
*C08K 5/34* (2006.01)
(52) U.S. Cl. ........... 524/89; 524/408; 524/430; 524/780
(58) Field of Classification Search ................. 524/408, 524/430, 780, 89
See application file for complete search history.

(56) References Cited

U.S. PATENT DOCUMENTS 7,193,789 B2   3/2007   Maetaki

FOREIGN PATENT DOCUMENTS

| JP | 2004-119118 | * | 1/2006 |
| JP | 2006-008926 |   | 1/2006 |
| JP | 2006-145823 |   | 6/2006 |
| JP | 2007-206354 |   | 8/2007 |

* cited by examiner

*Primary Examiner* — Edward Cain
(74) *Attorney, Agent, or Firm* — Kenyon & Kenyon, LLP (57) ABSTRACT

Provided are an optical material composition and an optical element that not only exhibit desirable anomalous dispersion properties but are also easy to process. The material composition for use in the optical element contains 5 weight % to 50 weight % of niobium (V) oxide fine particles (A), 49 weight % to 94 weight % of an organic compound (B) having one or more polymerizable functional groups in one molecule thereof, and 0.05 weight % to 5 weight % of a polymerization initiator (C).

7 Claims, 8 Drawing Sheets

MATERIAL COMPOSITION AND OPTICAL ELEMENTS USING THE SAME

CROSS-REFERENCE TO RELATED APPLICATIONS

This application is based upon and claims the benefit of priority from prior Japanese Patent Applications No.2008-135539, filed May 23, 2008, the entire contents of which are incorporated herein by reference.

BACKGROUND OF THE INVENTION

The present invention relates to optical material compositions suitable for forming optical elements, as well as to optical elements using cured products of such optical material compositions. In particular, the present invention relates to material compositions having anomalous dispersion properties and optical lenses formed of cured products of such material compositions.

Significant effort has recently been devoted to developing smaller, higher performance optical systems for use in imaging modules including cameras, video cameras, camera-equipped cell phones and videophones. These optical systems increasingly employ aspherical lenses and lenses made of anomalous dispersion glass to correct various aberrations. Anomalous dispersion glass is a type of glass used to reduce chromatic aberration and particularly to correct secondary spectrum. Optical materials with anomalous dispersion properties enable designing of smaller, higher performance optical systems for optical instruments and are therefore highly useful.

Known types of anomalous dispersion glass include fluorophosphate-based, $B_2O_3$—$Al_2O_3$—PbO-based, $SiO_2$—$B_2O_3$—$ZrO_2$—$Nb_2O_5$-based and other optical glass materials. These anomalous dispersion glass materials need to be ground and abraded to make optical elements such as lenses.

Anomalous dispersion glass materials having low melting points have recently been developed. Such glass materials can be formed into optical elements by pressing at high temperatures. Furthermore, anomalous dispersion optical materials are proposed in JP-A-2006-145823 (U.S. Pat. No. 7,193,789) that are formed of a UV-curable resin or N-polyvinylcarbazole in which nanoparticles of $TiO_2$, an inorganic oxide, have been dispersed.

SUMMARY OF THE INVENTION

The present invention provides a material composition containing 5 weight % to 50 weight % of niobium (V) oxide fine particles (A), 49 weight % to 94 weight % of an organic compound (B) having one or more polymerizable functional groups in one molecule thereof, and 0.05 weight % to 5 weight % of a polymerization initiator (C).

The present invention also provides a material composition that contains niobium (V) oxide fine particles (A), an organic compound (B) having one or more polymerizable functional groups in one molecule thereof and a polymerization initiator (C), and that is cured to form a cured product that satisfies the following relationships: $10 \leq vd \leq 40$ and $0.02 \leq \Delta\theta gF \leq 0.12$, where vd is the Abbe number of the cured product and $\Delta\theta gF$ is the anomalous dispersion of the cured product as determined for the F and g spectral lines.

In the material compositions described above, the organic compound (B) preferably includes at least one functional group selected from the group consisting of vinyl group, acryloyl group, methacryloyl group, isocyanate group, epoxy group and oxetane group.

In the material compositions described above, the organic compound (B) preferably includes an organic compound (B1) having one polymerizable functional group in one molecule thereof, and an organic compound (B2) having two or more polymerizable functional groups in one molecule thereof. Preferably, the weight ratio of (B1)/(B2) is in the range of 0.1 to 100.

In the material compositions described above, the organic compound (B) preferably includes at least one compound having at least one functional group selected from the group consisting of aromatic ring, fused polycyclic ring, carbazole ring and fluorene ring.

The present invention also provides an optical element that is formed of a cured product of a material composition containing 5 weight % to 50 weight % of niobium (V) oxide fine particles (A), 49 weight % to 94 weight % of an organic compound (B) having one or more polymerizable functional groups in one molecule thereof, and 0.05 weight % to 5 weight % of a polymerization initiator (C).

The present invention also provides an optical element that is formed of a cured product of a material composition that contains niobium (V) oxide fine particles (A), an organic compound (B) having one or more polymerizable functional groups in one molecule thereof, and a polymerization initiator (C). The cured product satisfies the following relationships: $10 \leq vd \leq 40$ and $0.02 \leq \Delta\theta gF \leq 0.12$, where vd is the Abbe number of the cured product and $\Delta\theta gF$ is the anomalous dispersion of the cured product as determined for the F and g spectral lines.

Preferably, the optical elements described above are each constructed as a composite optical element in which the cured product of the optical material composition is deposited on the surface of an optical substrate by a light-curing process.

The optical material composition of the present invention can be cured to form a cured product that has a suitable anomalous dispersion property for optical elements. The optical material composition of the present invention can also be charged in a mold and polymerized to provide a molded article. It can also be deposited on the surface of an optical substrate by a light-curing process to provide an optical element.

BRIEF DESCRIPTION OF THE DRAWINGS

The invention will be described with reference to the accompanying drawings, wherein like numbers reference like elements.

DETAILED DESCRIPTION OF EXEMPLARY EMBODIMENTS

The present invention is based on a finding that fine particles of niobium (V) oxide, a metal oxide that has high refractive index and specific anomalous dispersion properties, can be used with a particular polymerizable compound to form a composition that can be cured to make optical elements with desired anomalous dispersion properties and good processability.

Niobium (V) oxide fine particles for use in the present invention may be obtained by polymerizing a niobium alkoxide represented by the following chemical formula 1 or a hydrolysate thereof or from a liquid phase of an aqueous solution of a niobium compound.

Chemical Formula 1

$R^1_n Nb(OR^2)_{5-n}$ where $R^1$ is an organic group that is an alkyl group, halogenated alkyl group, aryl group, halogenated aryl group or cycloalkyl group; $R^2$ is an alkyl group or aryl group having 1 to 6 carbon atoms; and n is 0 or 1.

Examples of the alkyl group for $R^1$ include methyl group, ethyl group, isopropyl group, n-butyl group and isobutyl group. Examples of the halogenated alkyl group include trichloromethyl group, trifluoromethyl group and pentachloroethyl group. Examples of the aryl group include phenyl group and styryl group. Of these, methyl group and phenyl group are preferred.

Examples of the alkyl group or aryl group for $R^2$ include methyl group, ethyl group, isopropyl group, n-butyl group, isobutyl group and phenyl group. n is either 1 or 0. The properties of niobium (V) oxide are more effectively exploited when a is 0.

Specific examples of the niobium alkoxide or hydrolysates thereof include niobium pentamethoxide, niobium pentaethoxide, niobium pentapropoxide, niobium pentabutoxide, niobium methyltetramethoxide, niobium methyltetraethoxide, niobium methyltetrabutoxide, niobium phenyltetramethoxide, niobium phenyltetraethoxide and isomer thereof or hydrolysates thereof.

When a niobium alkoxide is used to produce the niobium (V) oxide fine particles for use in the present invention, the molecular weight of niobium (V) oxide, as well as its crystallinity and density, can be adjusted by properly adjusting the types and amounts of diluents or catalysts used in the polycondensation reaction and the temperature and time of the reaction. The molecular weight can affect the particle size, whereas the crystallinity and the density can affect the refractive index and the dispersion of the fine particles.

In addition to the hydrolysis of niobium alkoxides, the niobium (V) oxide fine particles may also be produced by other processes, such as liquid phase synthesis, precipitation, gas phase process using plasma and arc discharge, solid phase synthesis and pulverization of larger particles in a solid phase.

Preferably, the niobium (V) oxide fine particles are dispersed in a liquid and surface-modified with a silane-coupling agent, such as methacryl propyl trimethoxy silane, prior to addition to the material composition.

The amount of niobium (V) oxide in the optical material composition is preferably in the range of 5 weight % to 50 weight %. When present in an amount less than 5 weight %, the niobium (V) oxide cannot give the material composition sufficient Abbe number and anomalous dispersion properties, whereas the resulting material composition tends to become less fluid, making it difficult to process the optical elements, when the amount of niobium (V) oxide exceeds 50 weight %.

Preferably, the niobium (V) oxide fine particles (A) have an average (D50) particle size (primary particle size) of 20 nm or less and a D90 particle size of 30 nm or less. More preferably, the niobium (V) oxide fine particles (A) have an average (D50) particle size of 15 nm or less and a D90 particle size of 20 nm or less. The particle size can be determined by dynamic light scattering. As used herein, the term "average (D50) particle size" refers to the median of a particle size distribution and the term "D90 particle size" refers to the particle size that corresponds to the 90% percentile. If either of the average (D50) particle size or the D90 particle size of the niobium (V) oxide fine particles exceeds the respective specified size, then the transmittance or the light scattering property of the niobium (V) oxide fine particles may become excessively large. That is, even if the average particle size of niobium (V) oxide fine particles is 20 nm or less, the light scattering property may become excessive when the particle size distribution is wide to an extent that more than 10% of the entire particles are larger than 30 nm in size.

The polymerizable functional group of the organic compound (B) may be any functional group that can polymerize to form a polymer. Preferred examples include vinyl group, acryloyl group, methacryloyl group, isocyanate group, epoxy group and oxetane group. Of these, vinyl group, acryloyl group and methacryloyl group are particularly preferred because they enable effective curing of the organic compound (B) and allow a wide selection of compounds.

In addition to the polymerizable functional groups described above, the organic compound (B) preferably includes in its molecule an aromatic ring, a fused polycyclic ring, such as naphthalene ring and anthracene ring, a carbazole ring or a fluorene ring. It has been discovered that organic compounds having these ring structures have specific electron density distribution in their molecules and thus provide different Abbe number and anomalous dispersion properties from those of organic compounds having straight-chained structures or saturated ring structures.

Specific examples of such organic compounds (B) include methacrylic acid, acrylic acid, methyl(meth)acrylate, ethyl (meth)acrylate, propyl(meth)acrylate, 2-ethylhexyl(meth) acrylate, benzyl(meth)acrylate, phenyl(meth)acrylate, nonylphenyl(meth)acrylate, 2-hydroxypropyl(meth)acrylate, 2-ethylhexyl(meth)acrylate, dimethylol tricyclodecane di(meth)acrylate, isobornyl(meth)acrylate, trimethylolpropanetri(meth)acrylate, nonylphenyl(meth)acrylate, cyclohexyl(meth)acrylate, bisphenol A di(meth)acrylate, polyethylene glycol di(meth)acrylate, 2-phenyl-phenyl(meth) acrylate, fused polycyclic(meth)acrylates, such as 1-acryloyloxy-4-methoxy naphthalene and 10-acryloyloxy-10-methylbenzyl anthrone, fluorene-ring-containing (meth) acrylates, such as 9-fluorenyl acrylate and 9,9-bis[4-(2-acryloyloxyethoxy)phenyl]fluorene, carbazole(meth)acrylates, such as allyl carbazole, urethane acrylate, epoxy acrylate, oxetanes, such as 3-ethyl-3-(methacryloyloxymethyl)oxetane and 3-ethyl-3-(methacryloyloxymethyl)oxetane, vinyl benzene, divinyl benzene, vinyl 9-anthracenecarboxylate and 2-methacryloyloxyethyl isocyanate.

As used herein, the term "(meth)acrylate" is intended to include at least one of acrylate and methacrylate. One or more of these compounds may be chosen and mixed together. These compounds may be either monomers or oligomers.

Preferably, the amount of the organic compound (B) in the material composition is in the range of 49 weight % to 94 weight %. When the amount of the organic compound (B) is less than 49 weight %, the relative amount of niobium (V) oxide (A) increases, thus making it difficult to process the optical elements. Conversely, when the amount of the organic compound (B) is greater than 94 weight %, the relative amount of niobium (V) oxide (A) decreases. This makes it difficult to obtain a material composition that has a sufficient anomalous dispersion property to correct chromatic aberration.

The organic compound (B) is preferably composed of an organic compound (B1) having one polymerizable functional group in one molecule thereof and an organic compound (B2) having two or more polymerizable functional groups in one molecule thereof with the weight ratio of (B1)/(B2) preferably being in the range of 0.1 to 100. By adjusting the number of the polymerizable functional groups, the rate of the polymerization reaction can be adjusted to vary the degree of cure, the strength or the heat resistance of the resulting cured products as desired.

The cured product of the material composition of the present invention needs to have a particular degree of cure, strength, heat resistance or durability that makes the cured product suitable for use in optical elements. Too low a degree of cure or too low a heat resistance tends to make the cured product too soft to achieve the desired strength. Such a soft cured product can readily deform and may result in distorted optical surfaces when subjected to changes in temperature and humidity. On the other hand, an excessively high degree of cure can cause the build-up of stress that may result in decreased durability, such as lenses cracking when subjected to changes in temperature and humidity, and uneven optical properties.

Mixing different types of organic compounds that have different numbers of polymerizable functional groups provides an effective way to obtain durable cured products that have an optimum degree of cure and heat resistance. The weight ratio of (B1)/(B2) is particularly important to ensure strength, heat resistance or durability in composite optical elements in which the cured product of the material composition of the present invention is deposited on an optical substrate because properties such as strength, heat resistance and degree of deformation caused by changes in temperature or humidity can differ between the cured product of the material composition of the present invention and the optical substrate.

The cured product of the organic compound having one polymerizable functional group in one molecule thereof (B1) has a two-dimensional polymer chain structure. Although such two-dimensional structure may result in a decrease in the degree of cure, strength or heat resistance of the cured product, it also serves to reduce stress caused by curing and thereby increase the durability of the cured product. In comparison, the cured product of the organic compound having two or more polymerizable functional groups in one molecule thereof (B2) has a three-dimensional polymer chain structure. Such three-dimensional structure serves to increase the degree of cure, strength and heat resistance of the cured product and also to reduce the deformation caused by the changes in temperature. Thus, the organic compound (B) makes the material composition of the present invention highly useful as lens materials.

To achieve suitable properties of the material composition for use as optical elements, the weight ratio of (B1)/(B2) is preferably in the range of 0.1 to 100, and more preferably in the range of 0.25 to 10. If the weight ratio of (B1)/(B2) is greater than 100, the degree of cure, strength or heat resistance of the cured product may be decreased. If, on the other hand, the weight ratio of (B1)/(B2) is less than 0.1, the stress caused by curing may become excessively large and the cured product may become less durable against the changes in temperature or humidity.

Preferably, the amount of the polymerization initiator in the material composition is in the range of 0.05 weight % to 5 weight %. When present in amounts less than 0.05 weight %, the polymerization initiator cannot provide the material composition with sufficient curability, thus resulting in a cured product with a low degree of cure. On the other hand, when its amount exceeds 5 weight %, the polymerization initiator can lead to decreased transparency of the cured product or cause significant yellow color change in the cured product when the cured product is exposed to sun light.

While the polymerization initiator may be a thermal polymerization initiator or a photopolymerization initiator, photopolymerization initiators are preferred since photopolymerization initiators do not require heating and other time-consuming processes and can therefore allow effective curing. In addition, photopolymerization initiators are less susceptible to problems associated with heating that are encountered during the production of composite optical elements with other optical components.

Specific examples of the photopolymerization initiator include 4-dimethylamino benzoic acid, 4-dimethylamino benzoic acid esters, alkoxy acetophenones, benzyl dimethyl ketals, benzophenone and benzophenone derivatives, alkyl benzoylbenzoates, bis(4-dialkylaminophenyl)ketone, benzyl and benzyl derivatives, benzoin and benzoin derivatives, benzoin alkyl ethers, 2-hydroxy-2-methyl propiophenone, 1-hydroxycyclohexyl phenyl ketone, thioxanthone and thioxanthone derivatives and 2,4,6-trimethylbenzoyl diphenyl phosphine oxide. These photopolymerization initiators may be used either individually or in combination.

Of these photopolymerization initiators, acylphosphine oxide compounds, such as 2,4,6-trimethylbenzoyl diphenyl phosphine oxide and phenyl bis(2,4,6-trimethylbenzoyl)-phosphine oxide, are particularly preferred because of the high curability and transparency of the cured product achieved by using these photopolymerization initiators.

In addition to the above-described components, a UV absorber may be added to the optical material composition of the present embodiment to increase the durability.

Examples of the UV absorber include salicylic acid esters, such as phenyl salicylate, p-tert-butyl phenyl salicylate and p-octyl phenyl salicylate; benzophenones, such as 2,4-dihydroxy benzophenone, 2-hydroxy-4-acetoxyethoxy benzophenone, 2-hydroxy-4-methoxy benzophenone, 2,2'-dihydroxy-4-methoxy benzophenone, 2,2'-dihydroxy-4,4'-dimethoxybenzophenone, 2-hydroxy-4-n-octoxy benzophenone and Disodium 2,2'-dihydroxy-4,4'-dimethoxy-5,5'-disulfobenzophenone; benzotriazoles, such as 2(2'-hydroxy-5'-methylphenyl)benzotriazole, 2(2'-hydroxy-3',5'-di-tert-butylphenyl)benzotriazole, 2(2'-hydroxy-3'-tert-butyl-5'-methylphenyl)-5-chlorobenzotriazole, 2(2'-hydroxy-3',5'-di-tert-butylphenyl)-5-chlorobenzotriazole, 2(2'-hydroxy-3',5'-di-tert-amylphenyl)benzotriazole, 2(2'- hydroxy-5'-tert-butylphenyl)benzotriazole and 2(2'-hydroxy-5'-tert-octylphenyl)benzotriazole; benzoates, such as 2'4'-di-tert-butylphenyl-3,5-di-tert-butyl-4-hydroxybenzoate; cyanoacrylates, such as ethyl-2-cyano-3,3-diphenyl acrylate; and aminobenzoic acids, such as butyl p-aminobenzoic acid. These UV absorbers may be used either individually or as a mixture of two or more.

In addition to the above-described components, the optical material composition of the present embodiment may further contain an antioxidizing agent to increase the durability. Such antioxidizing agents include hindered phenol-based, hindered amine-based, phosphate-based or sulfur-based antioxidizing agents.

One method for preparing the material composition of the present embodiment involves adding the niobium (V) oxide fine particles (A) to the organic compound (B) and the polymerization initiator (C), and uniformly dispersing these components using a known dispersing apparatus, such as a bead mill, a ball mill, a jet mill and a homogenizer. The extent to which the components are dispersed in the material composition can be controlled by selecting the material and size of media used to disperse the components, such as beads and balls, and properly setting the conditions for the operation of the dispersing apparatus. Depending on the extent of dispersion of the material composition, a dispersing agent may be added in an amount that does not affect the anomalous dispersion properties or processability. A solvent may also be added temporarily, but needs to be removed before the composition is processed into finished optical elements.

An alternative method for preparing the material composition of the present embodiment involves pretreating the niobium (V) oxide fine particles (A) with a surface-modifying agent including a silane-based or titanium-based coupling agent, and subsequently uniformly dispersing the components using a known dispersing apparatus.

Figure 9:
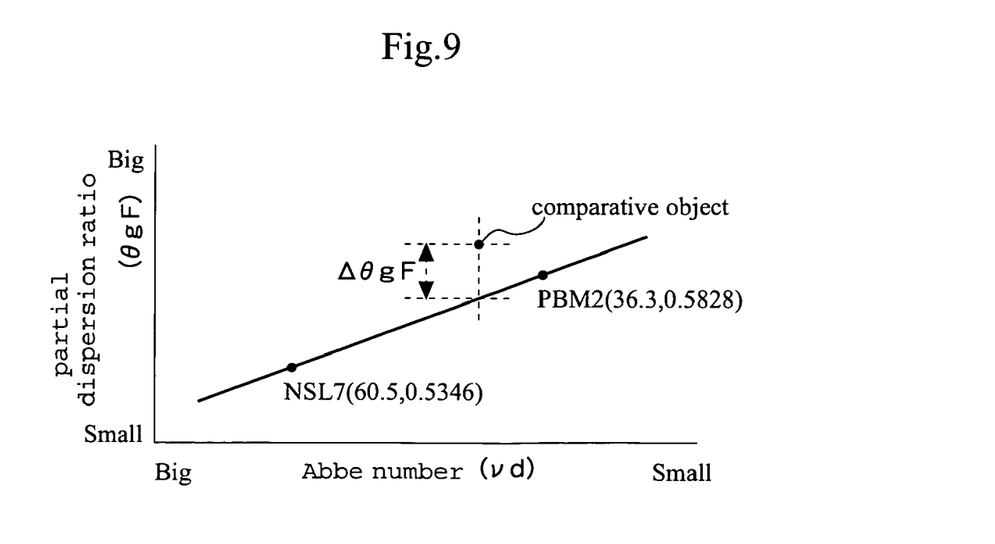
FIG. 9 is a diagram showing anomalous dispersion $\Delta\theta gF$.

In the present embodiment, the anomalous dispersion $\Delta\theta gF$ as a measure of anomalous dispersion properties was calculated in the following manner: Each partial dispersion ratio $\theta gF$ was determined by the Equation 1 given below. Data were plotted in a graph in which the horizontal axis represented the Abbe number (vd) and the vertical axis represented the partial dispersion ratio ($\theta gF$) Two types of normal optical glass, NSL7 (vd=60.5, $\theta gF$=0.5346, Ohara) and PBM2 (vd=36.3, $\theta gF$=0.5828, Ohara), were selected as standard dispersion glass materials that do not show anomalous dispersion properties. Data points (vd, $\theta gF$) were plotted for the two types of optical glass and a straight line was drawn through these points. The vertical distance between this line and the data point (vd, $\theta gF$) for a glass material of interest ($\Delta\theta gF$) was determined as anomalous dispersion indicative of anomalous dispersion properties of the glass material.

$$\theta gF=(ng-nF)/nF-nC) \qquad \text{Equation 1}$$

where ng, nF and nC are the refractive indices for spectral lines g, F and C, respectively.

The resin composition of the present embodiment is preferably such that the following relationships hold for its cured product:

$$10 \leq vd \leq 40 \text{ and } 0.02 \leq \Delta\theta gF \leq 0.12$$

where vd is the Abbe number of the cured product and $\Delta\theta gF$ is the anomalous dispersion of the cured product as determined for the F and g spectral lines. In other words, the resin composition of the present embodiment is preferably such that its cured product satisfies the above requirements. The cured product that meets these requirements can effectively reduce the chromatic aberration over a wide visible range from spectral line C to spectral line g.

Cured products of conventional resin compositions, organic compounds and optical glass materials all tend to have anomalous dispersion that increases over an Abbe number range of 40 or less in a graph in which the vertical axis represents the partial dispersion ratio ($\theta gF$) and the horizontal axis represents the Abbe number (vd). As a result, only a narrow range of anomalous dispersion can be selected for optical materials used to design optical systems. Thus, the chromatic aberration cannot effectively be corrected using any of conventional optical materials and it has therefore been difficult to design small, lightweight optical systems or high-performance optical systems.

As described above, the cured product of the material composition of the present embodiment is a hybrid material of the niobium (V) oxide fine particles (A) and the organic compound that have different Abbe numbers and anomalous dispersions. By adjusting the amounts of the niobium (V) oxide fine particles (A) and the organic compound, the Abbe number and the anomalous dispersion of the cured product can be adjusted to optimum values to effectively correct chromatic aberrations of an optical system. Furthermore, the cured product of the material composition can realize an Abbe number and anomalous dispersion that are not seen in any of conventional organic compounds or optical glass materials, so that it can be used to design small, lightweight optical systems or high-performance optical systems that have never been realized. Also, the cured product of the material composition can realize higher processability than conventional optical glass materials that have a similar Abbe number and anomalous dispersion.

An Abbe number vd of less than 10 may result in excessive reduction of chromatic aberrations in a wavelength range ranging from spectral line C to spectral line F and is therefore not preferred. An Abbe number vd of greater than 40 is not preferred, either, since the reduction of chromatic aberrations is small in a wavelength range ranging from spectral line C to spectral line F.

An anomalous dispersion $\Delta\theta gF$ of less than 0.02 is not preferred since the value is not significantly different from the anomalous dispersion of existing resin compositions and the effect of niobium (V) oxide is insignificant. An anomalous dispersion $\Delta\theta gF$ of greater than 0.12 is not preferred, either, since more than 50 weight % of niobium (V) oxide needs to be added, which increases the viscosity of the material composition and makes it difficult to process optical elements.

An Example using a material composition of the present embodiment will now be described, along with a Comparative Example that are free of the material composition of the present embodiment. For Example, the cured product of the material composition of the present embodiment is used to make an optical element and this optical element is used in an optical system.

Figure 1:
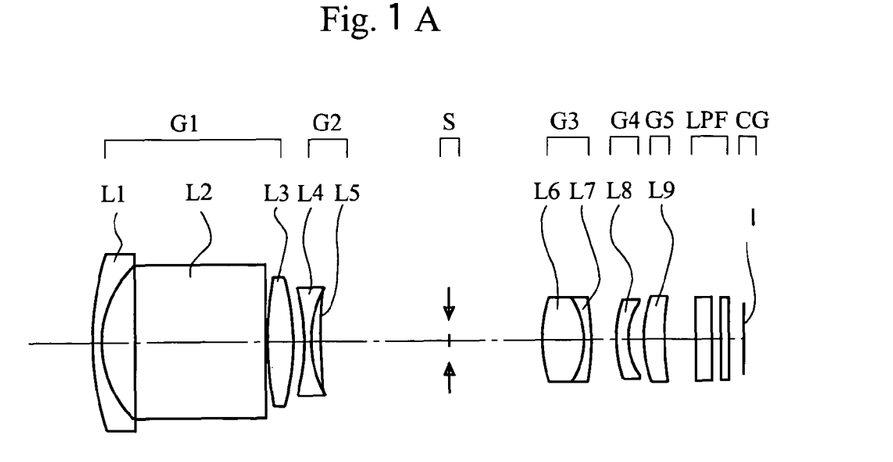
FIGS. 1A, 1B and 1C are each a cross-sectional view of an optical arrangement of Example focused at infinity, taken along its optical axis.

FIGS. 1A, 1B and 1C are each a cross-sectional view of an optical arrangement of Example focused at infinity, taken along its optical axis. The cross-sections shown in FIGS. 1A, 1B and 1C correspond to the wide angle end, an intermediate focal length and the telephoto end of the optical arrangement, respectively. The numerical representations in r1, r2, ..., and d1, d2, ..., in the lens cross-sections correspond to the numbers assigned to different surfaces and shown later in numerical data.

Figure 2A:
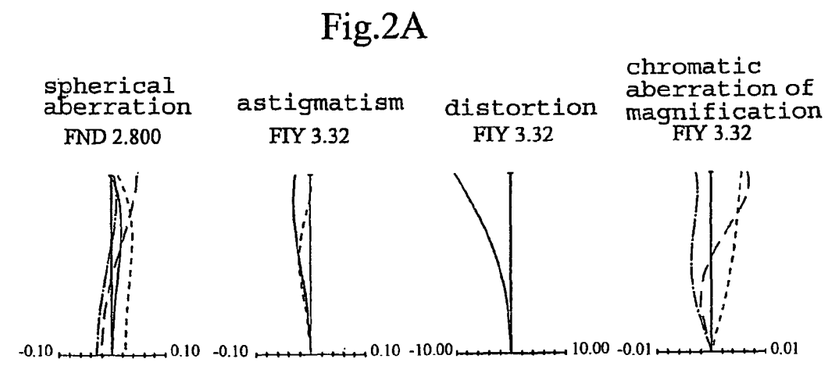
FIGS. 2A, 2B and 2C are diagrams each showing spherical aberration, astigmatism, distortion, chromatic aberration of magnification for the Example, with FIGS. 2A, 2B and 2C corresponding to the wide angle end, an intermediate focal length and the telephoto end of the optical arrangement, respectively.
Figure 2B:
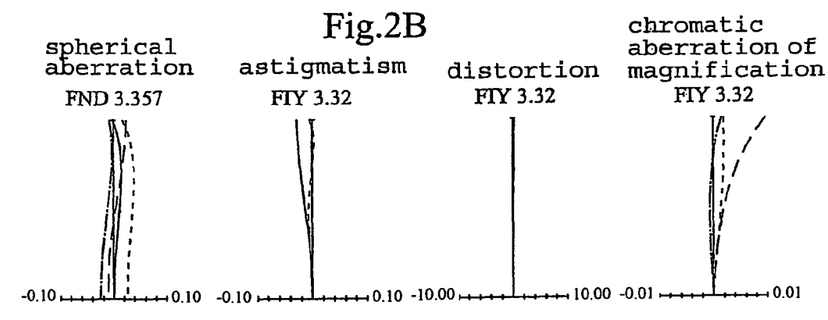
Figure 2C:
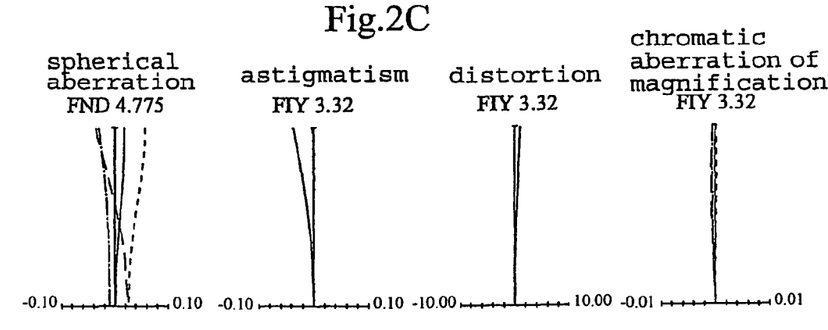

FIGS. 2A, 2B and 2C are diagrams each showing spherical aberration, astigmatism, distortion, chromatic aberration of magnification for Example, with FIGS. 2A, 2B and 2C corresponding to the wide angle end, an intermediate focal length and the telephoto end of the optical arrangement, respectively. FIY indicates an image height.

In Example, the fifth lens from the object side uses the cured product of the material composition of the present embodiment. In Example, the fifth lens has an Abbe number νd of 23 and an anomalous dispersion ΔθgF of 0.061. The desirable anomalous dispersion properties of the material composition of the present embodiment (or the cured product thereof) help minimize the axial chromatic aberration and chromatic aberration of magnification to realize a high-quality optical system.

Figure 3A:
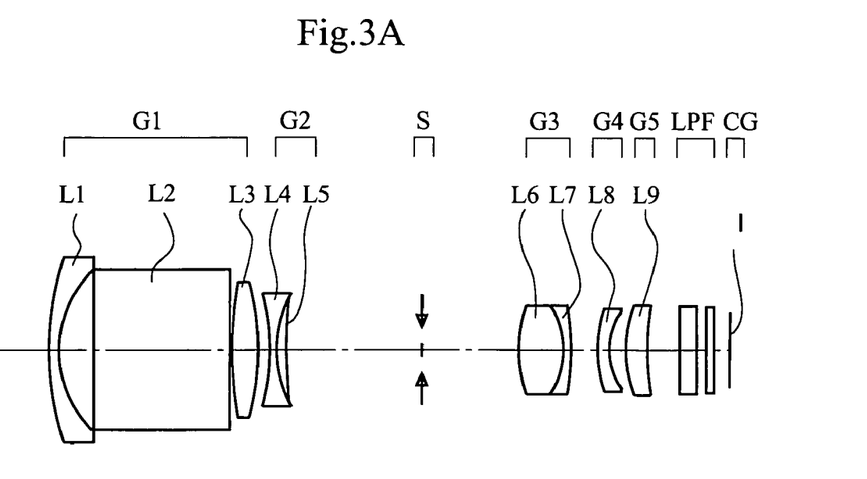
FIGS. 3A, 3B and 3C are each a cross-sectional view of a conventional optical arrangement (Conventional Example) focused at infinity, taken along its optical axis.
Figure 3B:
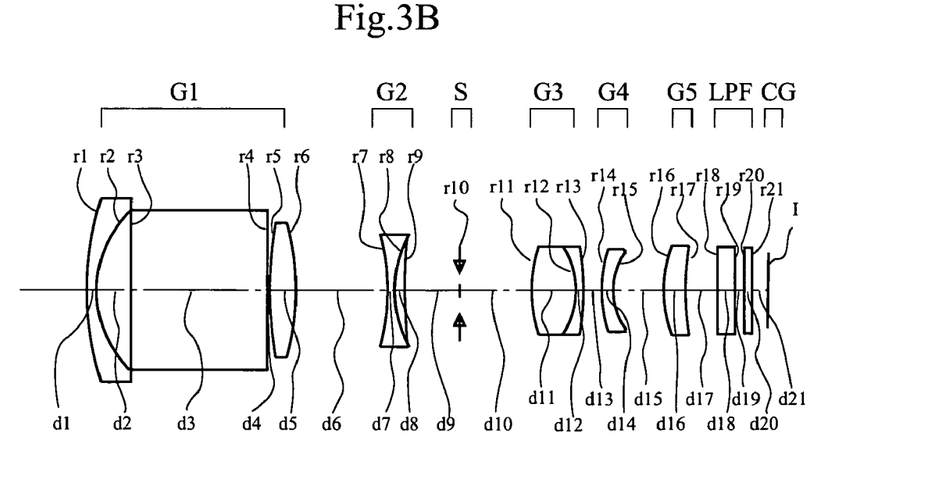
Figure 3C:
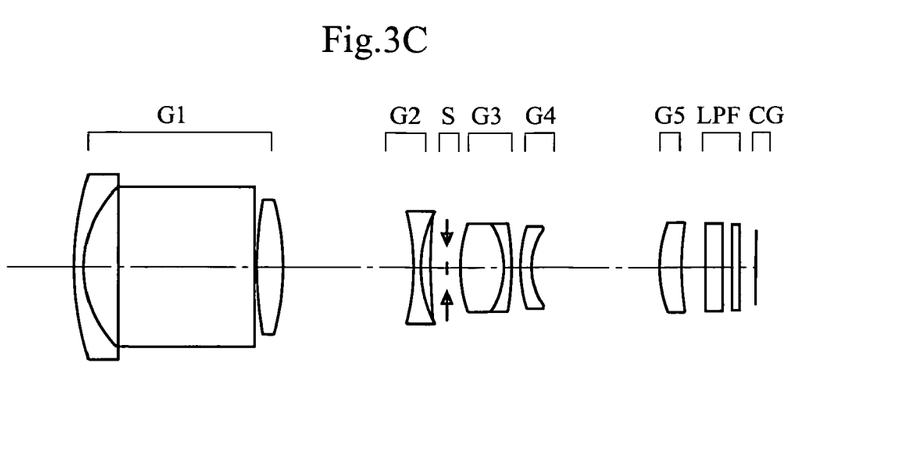
Figure 4A:
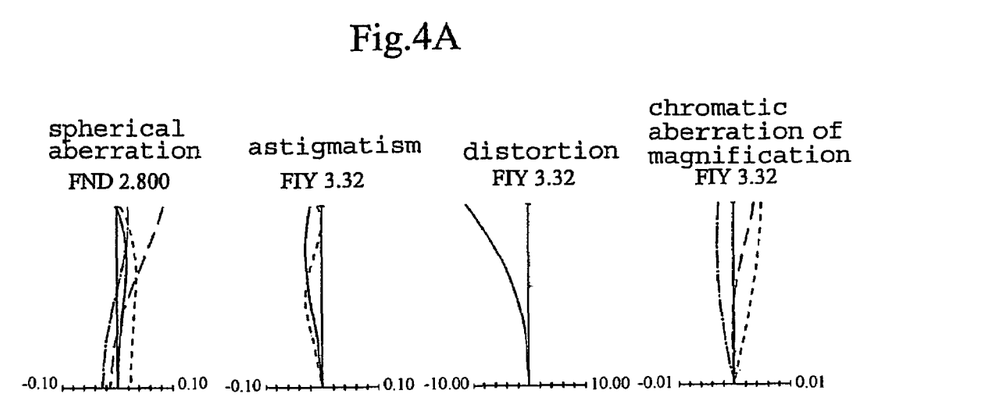
FIGS. 4A, 4B and 4C are diagrams each showing spherical aberration, astigmatism, distortion, chromatic aberration of magnification for Conventional Example, with FIGS. 4A, 4B and 4C corresponding to the wide angle end, an intermediate focal length and the telephoto end of the optical arrangement, respectively.
Figure 4B:
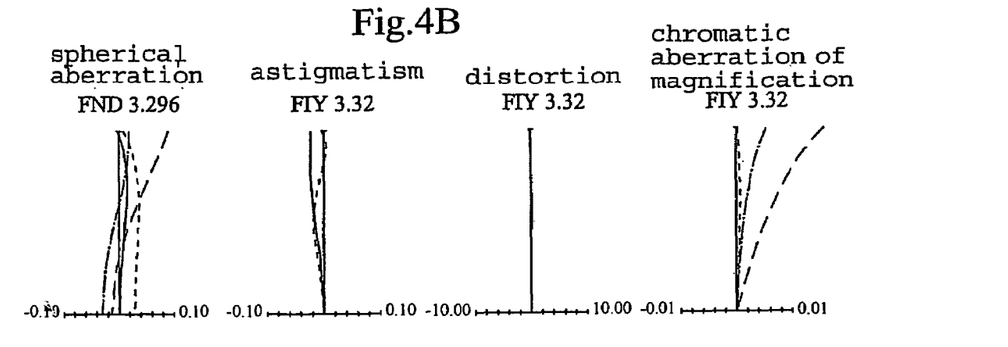
Figure 4C:
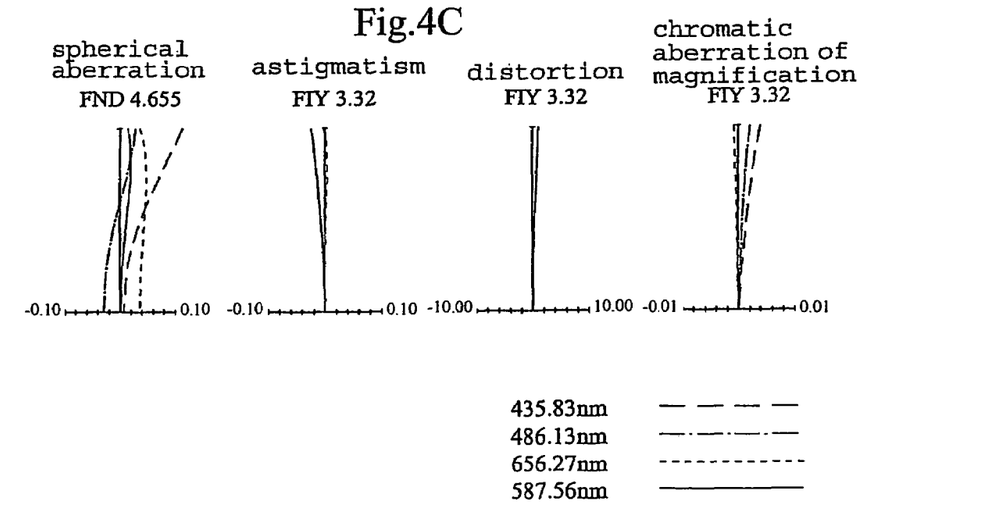

FIGS. 3A, 3B and 3C are each a cross-sectional view of a conventional optical system (Conventional Example), taken along its optical axis. FIGS. 4A, 4B and 4C show spherical aberration, astigmatism, distortion, chromatic aberration of magnification for Conventional Example. The aberration diagrams for Conventional Example show different aberrations that are corrected effectively.

The lens arrangement of the optical system of Conventional Example shown in FIGS. 3A through 3C is the same as that of the optical system of Example shown in FIGS. 1A through 1C. The focal length, F number, magnification ratio and other specifications of the optical system of Conventional Example are also the same as those of the optical system shown in FIGS. 1A through 1C. The optical system of Conventional Example differs from the optical system of Example in that the fifth lens from the object side is replaced with a lens made of optical glass S-NPH2 (Ohara). S-NPH2 used in Conventional Example has an Abbe number νd of 18.9 and an anomalous dispersion ΔθgF of 0.032, the values meeting the above-described requirements. Thus, S-NPH2 has an adequate anomalous dispersion properties. As can be seen from FIG. 4, the optical system has minimum axial chromatic aberration and chromatic aberration of magnification and is therefore of high quality, except that the lens thickness is relatively larger as compared to Example.

A comparison between the aberration diagrams of Example (FIGS. 2A through 2C) and those of Conventional Example (FIGS. 4A through 4C) indicates that the aberrations are effectively corrected by the optical system of Example to a degree comparable to those achieved by the optical system of Conventional Example. This suggests that the cured product of the material composition of the present embodiment can be used to make an optical system that is as effective in correcting the chromatic aberrations as the conventional optical system.

Numerical data for Example and Comparative Example are presented below. In the numerical data, the numbers under 'r' are curvatures of the respective lens surfaces, the numbers under 'd' are thicknesses of the respective lenses or air gaps, the numbers under 'nd' are refractive indices of the respective lenses with respect to spectral line d, and the numbers under 'νd' are Abbe numbers of the respective lenses. The sign '*' indicates an aspherical surface.

Given that z is the direction of the optical axis and y is the direction perpendicular to the optical axis, the shape of the aspherical surface can be given by the following equation:

$$z = (y^2/r)/[1 + \{1-(1+K)(y/r)^2\}^{1/2}] + A4y^4 + A6y^6 + A8y^8 + A10y^{10}$$

where K is conic constant and A4, A6, A8 and A10 are aspheric constants. In the aspherical surface data, E indicates the power of 10. Missing aspheric constants mean that the values are zero.

EXAMPLE

| Surface data | | | | |
|---|---|---|---|---|
| Surface No. | r | d | nd | νd |
| Object surface | INF | INF | | |
| 1 | 26.4564 | 0.9000 | 1.84666 | 23.78 |
| 2* | 10.0742 | 3.0000 | | |
| 3 | INF | 12.0000 | 1.80610 | 40.92 |
| 4 | INF | 0.2000 | | |
| 5* | 34.9519 | 2.4000 | 1.80610 | 40.92 |
| 6 | −24.2855 | 0.9999 | | |
| 7* | −26.2710 | 0.6000 | 1.74320 | 49.34 |
| 8* | 10.2309 | 0.9000 | 1.63494 | 23.22 |
| 9* | 34.1807 | 11.9143 | | |
| 10 (aperture) | INF | 8.6026 | | |
| 11* | 11.4252 | 4.0000 | 1.83481 | 42.71 |
| 12 | −7.3175 | 0.6000 | 1.80810 | 22.76 |
| 13 | −24.0548 | 2.3393 | | |
| 14 | 12.3855 | 1.0000 | 1.84666 | 23.78 |
| 15 | 6.3411 | 1.5001 | | |
| 16* | 11.3148 | 2.0000 | 1.49700 | 81.54 |
| 17 | 24.7330 | 2.7930 | | |
| 18 | INF | 1.5000 | 1.54771 | 62.84 |
| 19 | INF | 0.8000 | | |
| 20 | INF | 0.7500 | 1.51633 | 64.14 |
| 21 | INF | 1.3601 | | |
| Imaging surface | INF | | | |

| Aspherical Data |
|---|

Surface No. 2

K = −0.3690, A2 = 0.0000E+00, A4 = 2.9951E−05, A6 = 5.3453E−07, A8 = 0.0000E+00, A10 = 0.0000E+00

Surface No. 5

K = −0.3428, A2 = 0.0000E+00, A4 = 6.9553E−06, A6 = 1.0625E−07, A8 = 0.0000E+00, A10 = 0.0000E+00

Surface No. 7

K = −0.2849, A2 = 0.0000E+00, A4 = −3.0138E−04, A6 = 4.0578E−06, A8 = 0.0000E+00, A10 = 0.0000E+00

Surface No. 8

K = −0.0281, A2 = 0.0000E+00, A4 = 6.9302E−04, A6 = −3.1732E−05, A8 = 0.0000E+00, A10 = 0.0000E+00

Surface No. 9

K = −0.1005, A2 = 0.0000E+00, A4 = −5.3088E−04, A6 = 1.1655E−05, A8 = 0.0000E+00, A10 = 0.0000E+00

Surface No. 11

K = 0.0728, A2 = 0.0000E+00, A4 = −2.2619E−04, A6 = −4.6980E−08, A8 = 0.0000E+00, A10 = 0.0000E+00

Surface No. 16

K = −1.5301, A2 = 0.0000E+00, A4 = 1.1271E−04, A6 = 4.0725E−06, A8 = 0.0000E+00, A10 = 0.0000E+00

| Various data | | |
|---|---|---|
| Zoom ratio | | 3.00 |
| | Wide angle | Intermediate | Telephoto |
| Focal length | 5.99960 | 10.40020 | 17.99975 |
| F number | 2.8002 | 3.3565 | 4.7748 |
| Angle of view | 31.6° | 17.7° | 10.3° |
| Image height | 3.320 | 3.320 | 3.320 |
| Total lens length | 60.1593 | 60.1589 | 60.1593 |
| BF | 1.36009 | 1.36009 | 1.36009 |
| d6 | 0.99985 | 8.01310 | 11.51443 |

-continued

| | | | |
|---|---|---|---|
| d9 | 11.91428 | 4.90098 | 1.39971 |
| d10 | 8.60265 | 6.26147 | 1.19997 |
| d13 | 2.33934 | 1.73193 | 0.80014 |
| d15 | 1.50009 | 4.50020 | 11.23470 |
| d17 | 2.79301 | 2.74144 | 2.00025 |

Data for different zoom lens groups

| Group | Front surface | Focal length |
|---|---|---|
| 1 | 1 | 29.87719 |
| 2 | 7 | −17.20296 |
| 3 | 11 | 9.65903 |
| 4 | 14 | −16.60629 |
| 5 | 16 | 39.98504 |

Table of refractive indices of different glass materials
. . . Refractive Indices at Different Wavelengths of Different Media Used in Example

| Glass | 587.56 | 656.27 | 486.13 | 435.83 | 404.66 |
|---|---|---|---|---|---|
| L10 | 1.547710 | 1.545046 | 1.553762 | 1.558428 | 1.562261 |
| L5 | 1.634940 | 1.627290 | 1.654640 | 1.672908 | 1.689875 |
| L11 | 1.516330 | 1.513855 | 1.521905 | 1.526214 | 1.529768 |
| L9 | 1.496999 | 1.495136 | 1.501231 | 1.504507 | 1.507205 |
| L2, L3 | 1.806098 | 1.800248 | 1.819945 | 1.831174 | 1.840781 |
| L6 | 1.834807 | 1.828975 | 1.848520 | 1.859548 | 1.868911 |
| L4 | 1.743198 | 1.738653 | 1.753716 | 1.762047 | 1.769040 |
| L7 | 1.808095 | 1.798009 | 1.833513 | 1.855904 | 1.876580 |
| L1, L8 | 1.846660 | 1.836488 | 1.872096 | 1.894189 | 1.914294 |

Conventional Example

Surface data

| Surface No. | r | d | nd | νd |
|---|---|---|---|---|
| Object surface | INF | INF | | |
| 1 | 27.3626 | 0.9000 | 1.84666 | 23.78 |
| 2* | 10.1121 | 3.0000 | | |
| 3 | INF | 12.0000 | 1.80610 | 40.92 |
| 4 | INF | 0.2000 | | |
| 5* | 34.1036 | 2.4000 | 1.80610 | 40.92 |
| 6 | −24.1842 | 0.9999 | | |
| 7* | −19.6695 | 0.6000 | 1.74320 | 49.34 |
| 8 | 13.9199 | 1.3000 | 1.92286 | 18.903 |
| 9 | 28.1720 | 11.9098 | | |
| 10 (aperture) | INF | 8.5816 | | |
| 11* | 11.6806 | 4.0000 | 1.83481 | 42.71 |
| 12 | −7.0606 | 0.6000 | 1.80810 | 22.76 |
| 13 | −22.4815 | 2.3411 | | |
| 14 | 14.0648 | 1.0000 | 1.84666 | 23.78 |
| 15 | 6.7601 | 1.5001 | | |
| 16* | 10.6451 | 2.0000 | 1.49700 | 81.54 |
| 17 | 21.4972 | 2.8264 | | |
| 18 | INF | 1.5000 | 1.54771 | 62.84 |
| 19 | INF | 0.8000 | | |
| 20 | INF | 0.7500 | 1.51633 | 64.14 |
| 21 | INF | 1.3601 | | |
| Imaging surface | INF | | | |

Aspherical Data

Surface No. 2

$K = -0.4019, A2 = 0.0000E+00, A4 = 2.8028E-05, A6 = 7.9587E-07,$
$A8 = 0.0000E+00, A10 = 0.0000E+00$
Surface No. 5

$K = -0.3464, A2 = 0.0000E+00, A4 = 3.5796E-06, A6 = 1.4808E-07,$
$A8 = 0.0000E+00, A10 = 0.0000E+00$
Surface No. 7

$K = -0.2881, A2 = 0.0000E+00, A4 = 3.7992E-05, A6 = -1.0002E-06,$
$A8 = 0.0000E+00, A10 = 0.0000E+00$
Surface No. 11

$K = 0.0773, A2 = 0.0000E+00, A4 = -2.2695E-04, A6 = -2.0319E-07,$
$A8 = 0.0000E+00, A10 = 0.0000E+00$
Surface No. 16

$K = -1.5302, A2 = 0.0000E+00, A4 = 8.9552E-05, A6 = 6.6136E-06,$
$A8 = 0.0000E+00, A10 = 0.0000E+00$

Various data

| Zoom ratio | | 3.00 | |
|---|---|---|---|
| | Wide angle | Intermediate | Telephoto |
| Focal length | 5.99921 | 10.40005 | 17.99950 |
| F number | 2.8002 | 3.2959 | 4.6552 |
| Angle of view | 31.9° | 17.8° | 10.3° |
| Image height | 3.320 | 3.320 | 3.320 |
| Total lens length | 60.5689 | 60.5692 | 60.5689 |
| BF | 1.36013 | 1.36013 | 1.36013 |
| d6 | 0.99987 | 8.02133 | 11.51068 |
| d9 | 11.90975 | 4.88919 | 1.39897 |
| d10 | 8.58156 | 6.29409 | 1.20000 |
| d13 | 2.34114 | 1.76093 | 0.80033 |
| d15 | 1.50010 | 4.46452 | 11.24871 |
| d17 | 2.82637 | 2.72871 | 2.00010 |

Data for different zoom lens groups

| Group | Front surface | Focal length |
|---|---|---|
| 1 | 1 | 29.23916 |
| 2 | 7 | −17.11132 |
| 3 | 11 | 9.60458 |
| 4 | 14 | −16.40287 |
| 5 | 16 | 39.98276 |

Table of refractive indices of different glass materials
. . . Refractive Indices at Different Wavelengths of Different Media Used in Conventional Example

| Glass | 587.56 | 656.27 | 486.13 | 435.83 | 404.66 |
|---|---|---|---|---|---|
| L10 | 1.547710 | 1.545046 | 1.553762 | 1.558428 | 1.562261 |
| L11 | 1.516330 | 1.513855 | 1.521905 | 1.526214 | 1.529768 |
| L9 | 1.496999 | 1.495136 | 1.501231 | 1.504507 | 1.507205 |
| L2, L3 | 1.806098 | 1.800248 | 1.819945 | 1.831174 | 1.840781 |
| L6 | 1.834807 | 1.828975 | 1.848520 | 1.859548 | 1.868911 |
| L4 | 1.743198 | 1.738653 | 1.753716 | 1.762047 | 1.769040 |
| L7 | 1.808095 | 1.798009 | 1.833513 | 1.855904 | 1.876580 |
| L5 | 1.922860 | 1.909158 | 1.957996 | 1.989717 | 2.019763 |
| L1, L8 | 1.846660 | 1.836488 | 1.872096 | 1.894189 | 1.914294 |

Optical elements and composite optical elements will now be described with reference to the accompanying drawings. The optical elements and composite optical elements are made of the cured product of the material composition of the present embodiment.

Figure 5:
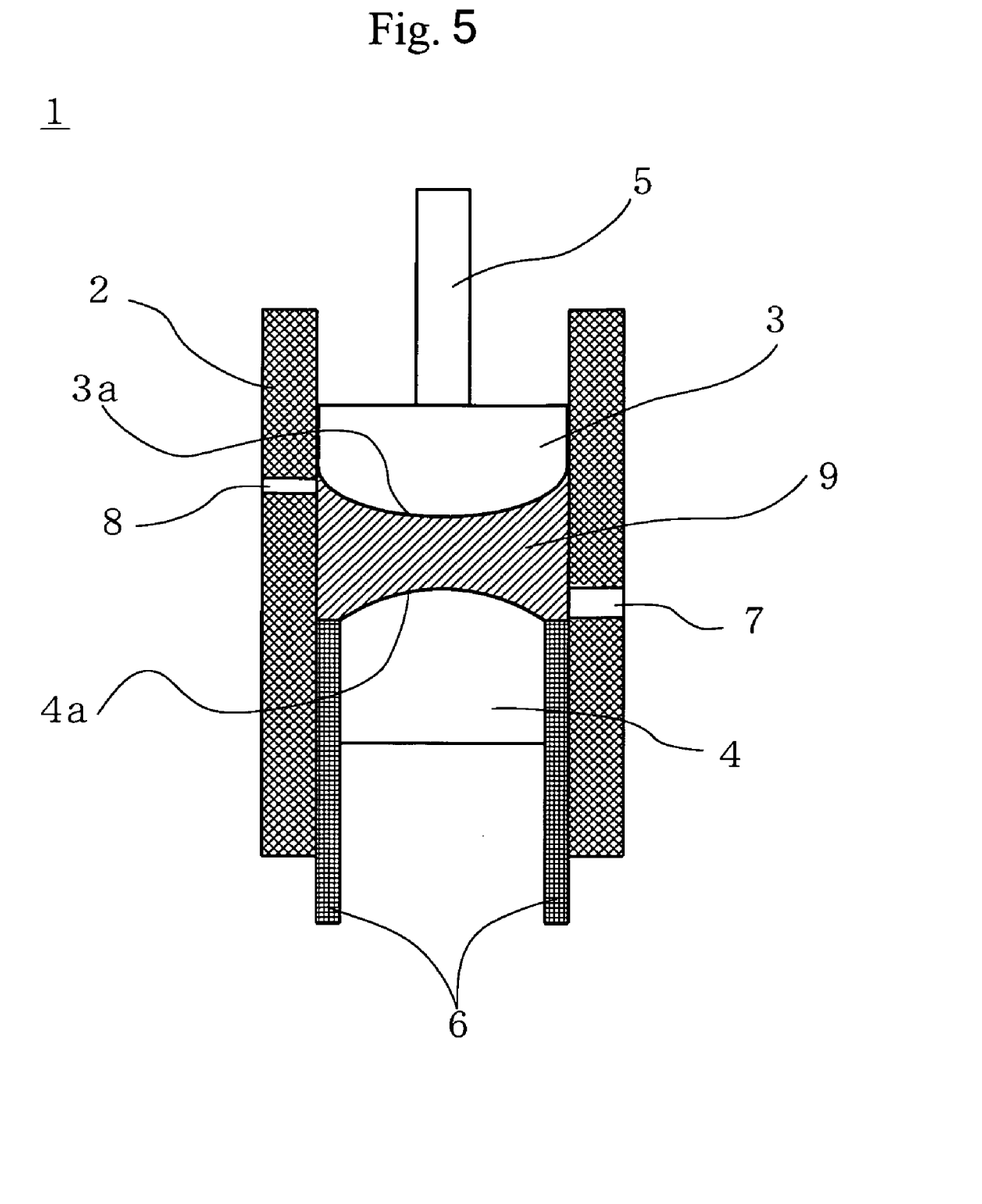
FIG. 5 shows one example of a molding apparatus for molding optical elements made solely of a cured product formed through polymerization of the material composition of the present invention.

FIG. 5 shows one example of an apparatus for molding optical elements.

As described, the optical element is made solely of the cured product formed through polymerization of the material composition of the present embodiment. An optical element-molding apparatus 1 includes a cylindrical metal body mold 2, a metal upper mold 3 having a desired optical surface 3*a*, a lower mold 4 having a desired optical surface 4*a* and formed of UV-transmitting glass, a drive rod 5 for vertically driving the upper mold 3, and a release pipe 6 for releasing the cured optical element from the lower mold 4.

The cylindrical metal body mold 2 includes an injection port 7 for injecting the material composition and a discharge port 8 for discharging the excess material composition. The drive rod 5 causes the upper mold 3 to slidably move in the vertical direction within the metal body mold 2 via a drive source (not shown). The release pipe 6 slidably moves in the vertical direction while in contact with the inner periphery of the metal body mold 2. The respective optical surfaces of the upper mold 3 and the lower mold 4 and the inner periphery of the metal body mold 2 together define a mold chamber 9 for molding an optical element.

The optical element is molded in the following manner: the metal upper mold 3 and the glass lower mold 4 are placed within the metal body mold 2 with the respective optical surfaces 3a and 4a opposing each other. The upper mold 3 is initially positioned at a first predetermined height by the drive rod 5. At the first predetermined height, the upper mold 3 is positioned above the discharge port 8. The mold chamber 9 is defined with the upper mold 3 held in place at the first predetermined height.

The material composition of the present invention is then injected through the injection port 7 to fill the mold chamber 9. During the injection, the pressure inside the mold chamber 9 is preferably kept negative to prevent air bubbles from being drawn into the material composition during injection and prevent air from remaining within the mold chamber. The temperature of the material composition is preferably adjusted to adjust the viscosity of the material composition and thus facilitate the injection of the material composition. Once the material composition starts to flow out from the discharge port 8, the mold chamber 9 is determined to be filled completely and the injection of the material composition is stopped.

At this point, the injection port 7 is sealed and the upper mold 3 is pushed downward to a second height. This causes the additional excess material composition to flow out from the discharge port 8. Subsequently, UV light is irradiated from below the lower mold 4 to cure the material composition. The UV irradiation apparatus is arranged below the release pipe 6 but is not shown in the drawing. The upper mold 3 is slowly moved downward as the material composition cures and contracts. Moving the upper mold 3 downward with the contraction of the material composition can reduce the internal stress of the cured optical element. Once the material composition has been cured sufficiently, the drive rod 5 is moved upward to release the upper mold 3. Subsequently, the release pipe 6 is moved upward to release the cured product from the lower mold 4. In this manner, the cured product of the material composition can be obtained as an optical element having a desired shape.

When both of the optical surfaces 3a, 4a in FIG. 5 are spherical surfaces, a spherical lens is produced as the optical element. When one or both of the optical surfaces 3a, 4a are aspherical surfaces, an aspherical lens is produced as the optical element. When one or both of the optical surfaces 3a, 4a are diffraction surfaces, a diffraction lens is produced as the optical element.

A composite optical element can be produced by curing the material composition on the surface of an optical substrate to form a laminate of the cured product of the material composition and the optical substrate. In the resulting composite optical element, the interface between the optical substrate and the cured product of the material composition is a spherical surface, an aspherical surface, a free curved surface or a diffraction surface.

The optical substrate for use in the composite optical element may be an optical glass material, an optical resin or a transparent ceramic that does not suffer problems such as chipping, surface discoloration, devitrification and opacity during processing into a desired shape. Examples of the optical glass include quartz, BK7 (Schott), BACD11 (Hoya), BAL42 and LAH53 (Ohara). Examples of the optical resin include amorphous polyolefins, such as ZEONEX (Zeon Corporation), ARTON (JSR) and APEL (Mitsui Chemicals), and acryl resins, such as ACRYPET (Mitsubishi Rayon) and DELPET (Asahi Kasei).

Specifically, the optical material composition of the present embodiment is deposited on the surface of the optical substrate, for example, by coating, and a mold is pressed against the upper surface of the deposited material composition to form a desired shape. While the mold used for this purpose may be made of metal or glass, a glass mold is used when UV light is irradiated from the opposite side of the optical substrate to cure the material composition. UV light is irradiated from the optical substrate side to cure the material composition when a metal mold is used.

Figure 6:
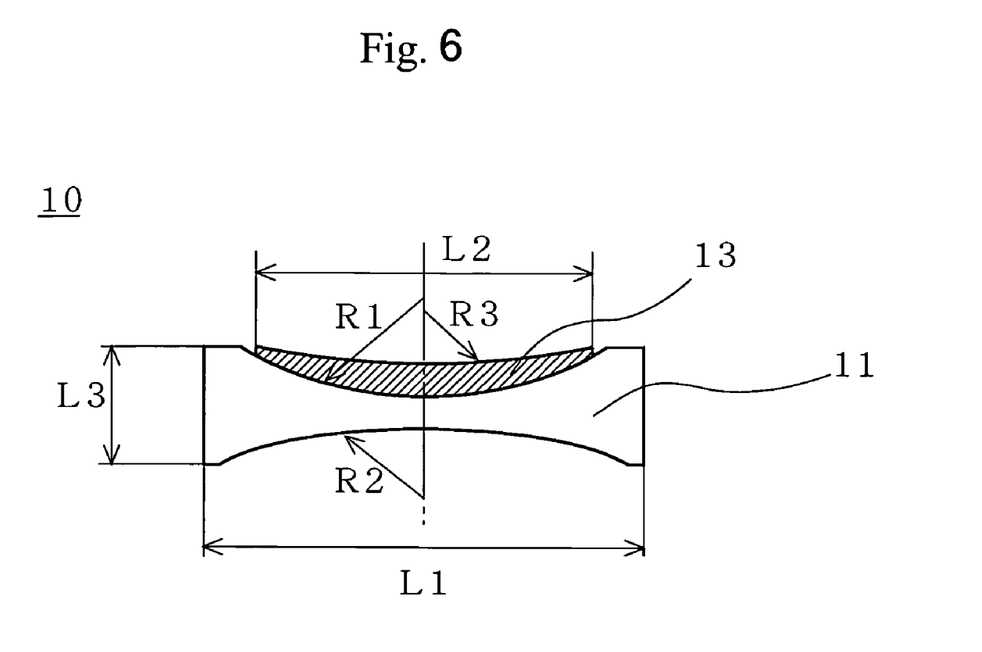
FIG. 6 is a diagram showing one example of a composite optical element.

In the above-described manner, a composite optical element such as the one shown in FIG. 6 can be produced. The composite optical element 10 shown in FIG. 6 includes an optical substrate 11 having the cured product 13 of the material composition integrally deposited on one surface thereof.

A production method of composite optical elements will now be described below.

Figure 7:
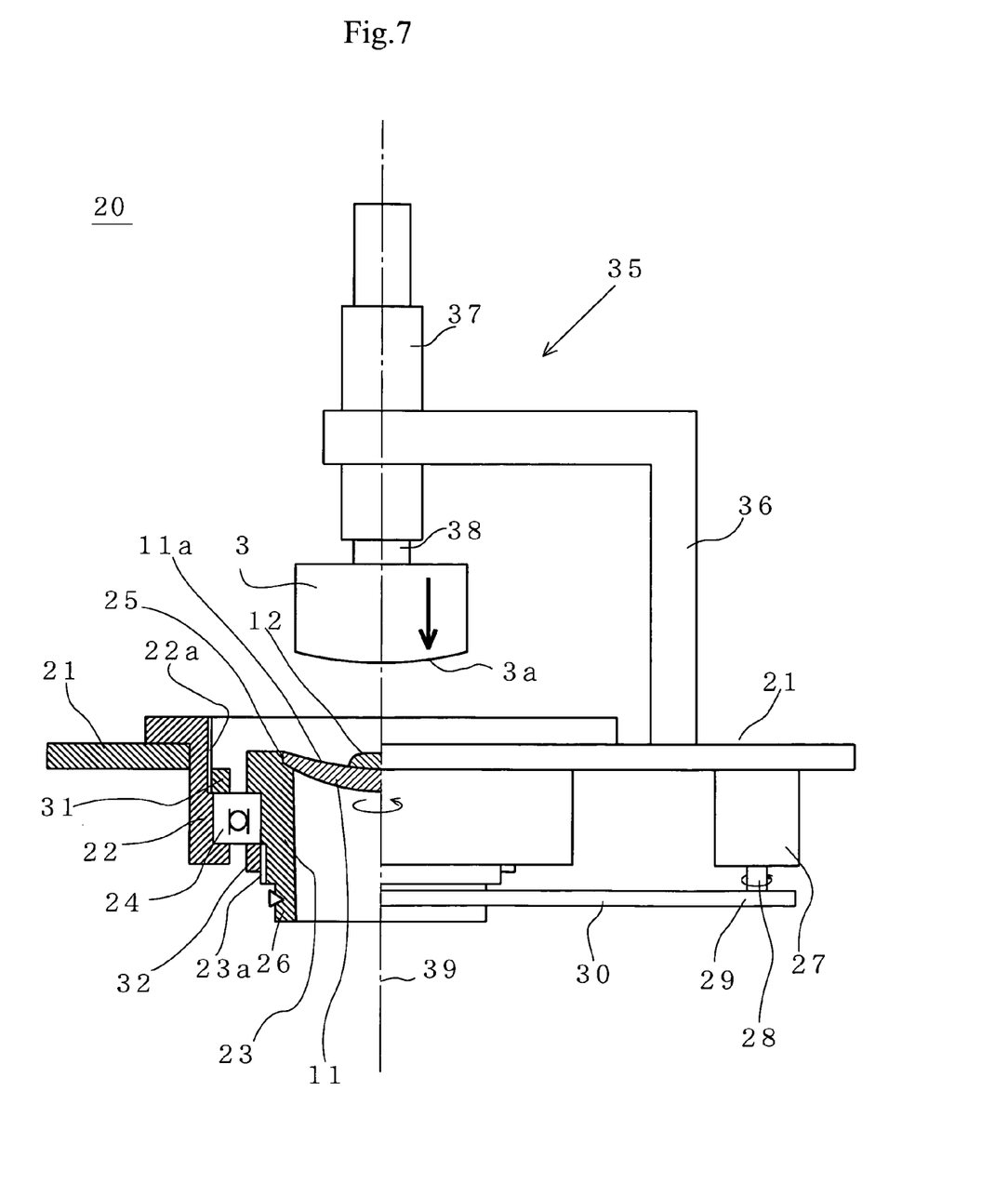
FIG. 7 is a diagram showing one example of a production apparatus of composite optical elements.

FIG. 7 shows an exemplary apparatus for producing composite optical elements. The left side of the apparatus relative to the optical axis is shown in a cross-section. The apparatus 20 for producing composite optical elements includes a framework (not shown), a support table 21, a bearing member 22 and a retainer cylinder 23. The support table 21 is supported by the framework. The bearing member 22 is generally cylindrical and is attached to the support table 21. The bearing member 22 has a bearing 24.

The retainer cylinder 23 is rotatably received by the bearing member 22 via the bearing 24 that allows the retainer cylinder 23 to rotate relative to the bearing member 22. The retainer cylinder 23 has an annular engaging edge 25 formed on the upper inner periphery thereof for receiving the outer edge of an optical substrate 11. A pulley 26 is formed integrally with the lower portion of the retainer cylinder 23.

A motor 27 is secured to the support table 21 on the bottom side thereof. A pulley 29 is attached to a drive shaft 28 of the motor 27. A belt 30 is wound about the pulley 29 and the pulley 26. These components together form a rotary mechanism for rotating the retainer cylinder 23.

The bearing 24 is held in place by retainer rings 31, 32. Specifically, the retainer ring 31 is in screw engagement with a threaded portion 22a on the bearing member 22 while the retainer ring 32 is in screw engagement with a threaded portion 23a on the retainer cylinder 23. In this manner, the bearing 24 is held in place between the bearing member 22 and the retainer cylinder 23.

Arranged above the support table 21 is support unit 35 for vertically moving an upper mold 3. The support unit 35 includes a support 36 secured to the upper surface of the support table 21 for supporting the upper mold 3 at a desired position. Mounted on the support 36 is a cylinder 37 that has a cylinder rod 38 attached thereto. The upper mold 3 is attached to the cylinder rod 38 at its end. The upper mold 3 is supported so that optical axis 39 of the optical substrate 11 aligns with the central axis of the upper mold 3 when the optical substrate 11 is placed on the engaging edge 25 of the retainer cylinder 23.

A production method of composite optical elements using the above-described production apparatus will now be described.

The optical substrate 11, a lens having desired optical characteristics, is mounted on the apparatus 20 so that it is properly positioned by the engaging edge 25 of the retainer cylinder 23. The surface 11a of the optical substrate 11 on which the material composition is to be deposited may be treated with a coupling agent to improve the adhesion between the material composition and the optical glass substrate. Using a dispenser (not shown), a required amount of the material composition 12 is then dispensed onto the surface 11a of the optical substrate 11. Preferably, the temperature of the material composition is adjusted to adjust the viscosity of the material composition and, thus, the dispensing of the material composition is facilitated.

Subsequently, the cylinder 35 is activated to move the upper mold 3 downward until the optical surface 3a of the upper mold 3 comes into contact with the material composition 12 dispensed on the surface 11a of the optical substrate 11. Moving the upper mold 3 further downward spreads the material composition 12 into a predetermined shape. The descent of the upper mold 3 is stopped before the material composition 12 has been spread into the predetermined shape. At this point, the motor 27 is activated to rotate the retainer cylinder 23 and, thus, the optical substrate 11 at least one full turn.

Figure 8:
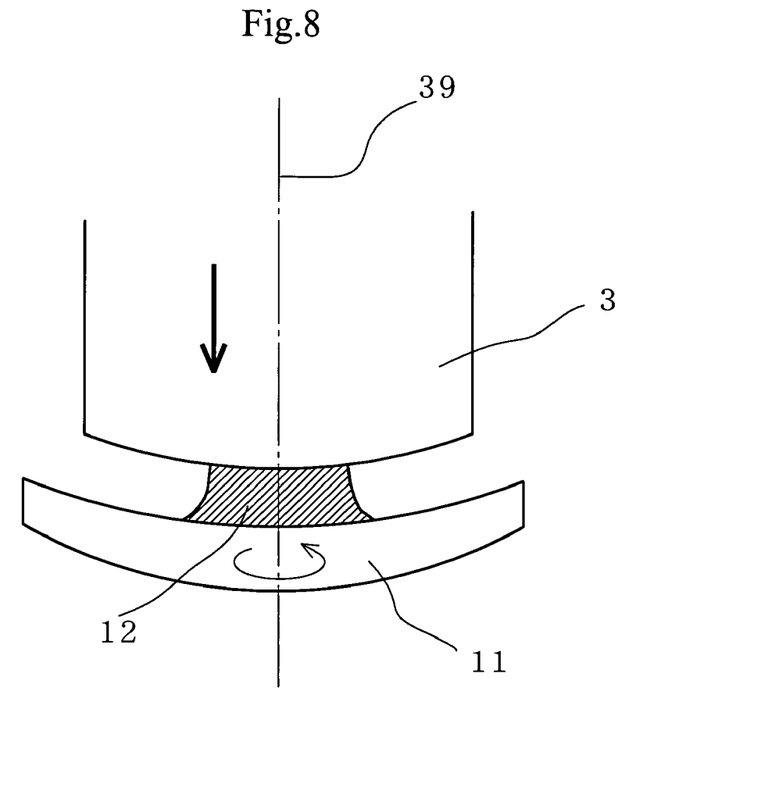
FIG. 8 is a diagram showing the manner in which the material composition of the present invention is spread.

FIG. 8 illustrates the manner in which the material composition is spread.

Specifically, the upper mold 3 is pressed against the material composition 12 placed on the surface 11a of the optical substrate 11 with the optical axis 39 of the optical substrate 11 aligned with the central axis of the upper mold 3. In this state, the optical substrate 11 is rotated at least one full turn. This causes the material composition 12 to spread evenly in the space between the surface 11a of the optical substrate 11 and the upper mold 3, thereby forming a layer of the material composition.

Subsequently, the cylinder 37 is activated again to move the upper mold 3 further downward until the layer of the material composition 12 has a predetermined shape with a desired thickness and diameter, at which point the decent of the upper mold 3 is stopped. UV light is irradiated from below the optical substrate 11 from a UV irradiation apparatus (not shown).

This causes the material composition between the upper mold 3 and the optical substrate 11 to cure and, as a result, a cured product 13 of the material composition is deposited integrally with the surface 11a of the optical substrate 11. The optical surface 3a of the upper mold 3 is transferred to the surface of the cured product 13 of the material composition, forming an optical surface on the cured product 13. The optical surface 3a of the upper mold 3 is then released from the surface of the cured product 13 of the material composition to obtain a composite optical element having the desired shape.

Example 1

Preparation of Material Composition 1-acryloyloxy-4-methoxynaphthalene (indicated as AMN in Table 1) was used in a proportion shown in Table 1 as organic compound (B1). 9,9-bis[4-(2-acryloyloxyethoxy) phenyl]fluorene (indicated as BPEPA in Table 1), and dimethyloltricyclodecane diacrylate (indicated as DMTCA in Table 1), were used in proportions shown in Table 1 as organic compound (B2). Subsequently, 2-hydroxy-2-methyl-1-phenylpropane-1-one (indicated as HMFPO in Table 1) as polymerization initiator (C) was added in a proportion shown in Table 1 and the mixture was mixed. The resulting mixture was mixed in a wet bead mill with 0.03-mm beads at 60° C. for 3 hours to obtain a material composition.

Fabrication of Optical Element

The material composition was shaped into a 1-mm-thick piece with 20 mm in diameter. The piece was irradiated with UV light having a wavelength of 400 nm at an illuminance of 100 mW/cm$^2$ for 100 seconds. Subsequently, the piece was heated for 1 hour at 80° C. to give a cured product. The refractive index of the resulting cured product was measured and the Abbe number νd, the partial dispersion ratio θgF and the anomalous dispersion ΔθgF were determined in the manner described below. The results are shown in Table 2.

1. Measurement of Refractive Index

The refractive indices of the cured product with respect to d, C, F and g spectral lines were measured by a precision refractometer (KPR-200, Shimadzu Device) in a measurement environment of 20° C. and 60% RH.

2. Calculation of Abbe Number νd

Given that the refractive indices of the cured product measured for d, C, F and g spectral lines are nd, nC, nF and ng, respectively, the Abbe number νd can be calculated from the following Equation 2:

$$\nu d=(nd-1)/(nF-nC) \qquad \text{Equation 2}$$

3. Calculation of Partial Dispersion Ratio θgF

Given that the refractive indices of the cured product measured for d, C, F and g spectral lines are nd, nC, nF and ng, respectively, the partial dispersion ratio θgF can be calculated from the following Equation 3:

$$\theta g=(ng-nF)/(nF-nC) \qquad \text{Equation 3}$$

4. Calculation of Anomalous Dispersion ΔθgF

Two types of normal optical glass, NSL7 (νd=60.5, θgF=0.5346, Ohara) and PBM2 (νd=36.3, θgF=0.5828, Ohara), were 0.5346, Ohara) and PBM2 (νd=36.3, θgF=0.5828, Ohara), were selected as standard dispersion glass materials that do not exhibit anomalous dispersion properties. Data points (νd, θgF) for the two types of optical glass were plotted in a graph in which the horizontal axis represented the Abbe number νd and the vertical axis represented the partial dispersion ratio θgF. A straight line was drawn through these data points. The Abbe number νd and the partial dispersion ratio θgF of the cured product determined from the Equations 2 and 3 were then plotted in the same graph and the vertical distance between the straight line and the data point (νd, θgF) for the cured product (ΔθgF) was determined as the anomalous dispersion.

Specifically, assuming that $vd_0$ represents the Abbe number and $\theta gF_0$ represents the partial dispersion ratio, the straight line connecting the data points for the two types of standard dispersion glass can be represented by the Equation 4 given below. Then, given that the Abbe number of the cured product obtained from the Equation 2 is vd and the partial dispersion ratio of the cured product obtained from the Equation 3 is θgF, the anomalous dispersion ΔθgF can be determined from the Equation 5 below.

$$\theta gF_0 = -0.001989 \times vd_o + 0.6551 \quad \text{Equation 4}$$

$$\Delta\theta gF = \theta gF - \theta gF_o \quad \text{Equation 5}$$
$$= \theta gF - (-0.001989 \times vd + 0.6551)$$

Fabrication of Composite Optical Element

The material composition and a substrate formed of BK7 glass material (Schott) were processed on the molding apparatus shown in FIG. 7 to make a composite optical element having a shape as shown in FIG. 6. In each case, UV light having a wavelength of 400 nm was irradiated at an illuminance of 100 mW/cm² for 100 seconds. Subsequent heating for 1 hour at 80° C. gave the composite optical element having a shape as shown in FIG. 6.

The glass lens substrate as shown in FIG. 6 had the following dimensions: the radius of curvature R1=16 mm, the radius of curvature R2=16 mm, L1=20 mm and L3=5 mm. The cured product was deposited on the substrate so that the resulting composite optical element would have the following dimensions: the radius of curvature R3=26 mm and aperture size L2=16 mm. The composite optical element was evaluated for processability in the manner described below.

5. Evaluation of Processability

The radius of the curvature of the cured surface of the material composition on the composite optical element was measured by a surface roughness analyzer (Form Talysurf PGI plus, Taylor Hobson). The amount of deformation relative to the radius of curvature R3 was determined as a measure of the processability. A composite optical element deformed by an amount of ±2 μm or less was rated to be 'good', otherwise it was rated as 'defective.'

Examples 2 Through 4

A material composition was prepared in the same manner as in Example 1, except that the proportions of respective components were changed as shown in Table 1. Using the material composition, an optical element was fabricated and evaluated as in Example 1. The results are shown in Table 2.

Example 5

N-(β-methacryloyloxyethyl)carbazole (indicated as NMC in Table 1) was used as organic compound (B1).
9,9-bis[4-(2-acryloyloxyethoxy)phenyl]fluorene (indicated as BPEPA in Table 1) and ethylene oxide 2 mol add bisphenol A dimethacrylate (indicated as BA2M in Table 1) were used as organic compound (B2). Bis(2,4,6-trimethylbenzoyl)-phenylphosphine oxide (indicated as BTMPO in Table 1) was used as polymerization initiator (C). As in Example 1, organic compound (B1), organic compound (B2), polymerization initiator (C) and niobium (V) oxide were mixed together in respective proportions shown in Table 1 to form a material composition. Using the material composition, an optical element was fabricated and evaluated as in Example 1. The results are shown in Table 2.

Example 6

N-(β-methacryloyloxyethyl)carbazole (indicated as NMC in Table 1), isobornyl methacrylate (indicated as IBM in Table 1) and 1-acryloyloxy-4-methoxynaphthalele (indicated as AMN in Table 1) were used as organic compound (B1).
Dimethyloltricyclodecanediacrylate (indicated as AMN in Table 1) were used as organic compound (B2).
Bis(2,4,6-trimethylbenzoyl)-phenylphosphine oxide (indicated as BTMPO in Table 1) was used in a proportion shown in Table 1 as polymerization initiator (C). Organic compound (B1), organic compound (B2), polymerization initiator and niobium (V) oxide were mixed together in respective proportions shown in Table 1 to form a material composition. Using the material composition, an optical element was fabricated and evaluated as in Example 1. The results are shown in Table 2.

Example 7

Isobornyl methacrylate (indicated as IBM in Table 1) and 1-acryloyloxy-4-methoxynaphthalene (indicated as AMN in Table 1) were used as organic compound (B1).
9,9-bis[4-(2-acryloyloxyethoxy)phenyl]fluorene (indicated as BPEPA in Table 1) and ethylene oxide 2 mol add bisphenol A dimethacrylate (indicated as BA2M in Table 1) were used as organic compound (B2). Bis(2,4,6-trimethylbenzoyl)-phenylphosphine oxide (indicated as BTMPO in Table 1) was used as polymerization initiator (C). Organic compound (B1), organic compound (B2) and polymerization initiator (C) were mixed together in respective proportions shown in Table 1 to form a material composition. Using the material composition, an optical element was fabricated and evaluated as in Example 1. The results are shown in Table 2.

Comparative Examples 1 to 2

The components shown in Table 1 were mixed together in respective proportions shown in Table 1 to form a material composition. Using the material composition, an optical element was fabricated and evaluated as in Example 1. The results are shown in Table 2.

Comparative Example 1, which used a material composition containing 60 weight % of niobium (V) oxide fine particles (A), was highly viscous and showed poor processability because of the abundance of niobium (V) oxide.

Comparative Example 2, which used a material composition containing 1 weight % of niobium (V) oxide fine particles (A), could not achieve an Abbe number required for the correction of chromatic aberrations.

Comparative Example 3

Comparative Example 3, which used a material composition containing 2 weight % of niobium (V) oxide fine particles (A), could not achieve an Abbe number required for the correction of chromatic aberrations. In Comparative Example 3, the weight ratio of organic compound (B1)/(B2) was zero. As a result, significant stress built up upon curing, leading to a poor accuracy of the radius of curvature of the cured surface.

TABLE 1

| | Organic Compound (B1) (weight %) | | | Organic Compound (B2) (weight %) | | | | | Niobium Oxide (A) | Polymerization Initiator(weight %) | |
|---|---|---|---|---|---|---|---|---|---|---|---|
| | AMN | IBM | AMBA | BPEPA | DMTCA | BA2M | B1/B2 | Total (B) | (weight %) | BTMPO | HMFPO |
| Ex. 1 | 0 | 0 | 14 | 24 | 56 | 0 | 0.18 | 94 | 5 | 0 | 1 |
| Ex. 2 | 0 | 0 | 9 | 27 | 53 | 0 | 0.11 | 89 | 10 | 0 | 1 |
| Ex. 3 | 0 | 0 | 8 | 24 | 47 | 0 | 0.11 | 79 | 30 | 0 | 1 |
| Ex. 4 | 0 | 0 | 7 | 21 | 41 | 0 | 0.11 | 69 | 50 | 0 | 1 |
| Ex. 5 | 26 | 0 | 0 | 43 | 0 | 17 | 0.43 | 86 | 10 | 4 | 0 |
| Ex. 6 | 18 | 53 | 13 | 0 | 4 | 0 | 19.00 | 89 | 20 | 1 | 0 |
| Ex. 7 | 0 | 27 | 9 | 27 | 0 | 27 | 0.67 | 89 | 10 | 1 | 0 |
| Comp. 1 | 0 | 0 | 31 | 8 | 0 | 0 | 4.00 | 39 | 60 | 1 | 0 |
| Comp. 2 | 0 | 0 | 78 | 20 | 0 | 0 | 1.00 | 98 | 1 | 1 | 0 |
| Comp. 3 | 0 | 0 | 0 | 47 | 24 | 8 | 0.00 | 79 | 20 | 1 | 0 |

TABLE 2

| | Abbe number | ΘgF | ΔΘgF | Transparency | Processability |
|---|---|---|---|---|---|
| Example 1 | 39 | 0.607 | 0.029 | Good | Good |
| Example 2 | 37 | 0.620 | 0.039 | Good | Good |
| Example 3 | 31 | 0.668 | 0.075 | Good | Good |
| Example 4 | 26 | 0.709 | 0.106 | Good | Good |
| Example 5 | 24 | 0.659 | 0.051 | Good | Good |
| Example 6 | 22 | 0.684 | 0.073 | Good | Good |
| Example 7 | 26 | 0.649 | 0.046 | Good | Good |
| Comp. Ex. 1 | 24 | 0.729 | 0.121 | Good | Good |
| Comp. Ex. 2 | 41 | 0.591 | 0.019 | Good | Good |
| Comp. Ex. 3 | 28 | 0.652 | 0.052 | Good | Defective |

As set forth, the material composition of the present invention can readily cure upon exposure to UV light or other curing light and is therefore highly productive. In addition, its cured product has a sufficient anomalous dispersion property that makes it suitable for the production of optical elements with decreased chromatic aberrations. The optical material composition also benefits from high processability. Optical elements formed of the cured product of the material composition are suitable for use in a wide range of optical instruments since they can minimize chromatic aberrations of the optical systems and make it possible to design smaller and lighter optical systems.

What is claimed is:

1. A material composition comprising:
   5 weight % to 50 weight % of niobium (V) oxide fine particles (A);
   49 weight % to 94 weight % of an organic compound (B) comprising at least one of allyl carbazole and N-(β-methacryloyloxyethyl)carbazole having one or more polymerizable functional groups in one molecule thereof; and
   0.05 weight % to 5 weight % of a polymerization initiator (C), wherein the material composition is cured to form a cured product that satisfies the following relationships:

$$10 \leq \nu d \leq 40$$

and $$0.02 \leq \Delta\theta gF \leq 0.12$$

where $\nu d$ is the Abbe number of the cured product and $\Delta\theta gF$ is the anomalous dispersion of the cured product as determined for the F and g spectral lines.

2. The material composition according to claim 1, wherein the organic compound (B) has at least one functional group selected from the group consisting of vinyl group, acryloyl group, methacryloyl group, isocyanate group, epoxy group and oxetane group.

3. The material composition according to claim 2, wherein the organic compound (B) comprises an organic compound (B1) having one polymerizable functional group in one molecule thereof, and an organic compound (B2) having two or more polymerizable functional groups in one molecule thereof with the weight ratio of (B1)/(B2) being in the range of 0.1 to 100.

4. An optical element comprising a cured product of a material composition that contains 5 weight % to 50 weight % of niobium (V) oxide fine particles (A), 49 weight % to 94 weight % of an organic compound (B) comprising at least one of allyl carbazole and N-(β-methacryloyloxyethyl)carbazole having one or more polymerizable functional groups in one molecule thereof, and 0.05 weight % to 5 weight % of a polymerization initiator (C), wherein the cured product satisfies the following relationships:

$$10 \leq \nu d \leq 40$$

and $$0.02 \leq \Delta\theta gF \leq 0.12$$

where $\nu d$ is the Abbe number of the cured product and $\Delta\theta gF$ is the anomalous dispersion of the cured product as determined for the f and g spectral lines.

5. The optical element according to claim 4, wherein the organic compound (B) has at least one functional group selected from the group consisting of vinyl group, acryloyl group, methacryloyl group, isocyanate group, epoxy group and oxetane group.

6. The optical element according to claim 5, wherein the organic compound (B) comprises an organic compound (B1) having one polymerizable functional group in one molecule thereof, and an organic compound (B2) having two or more polymerizable functional groups in one molecule thereof with the weight ratio of (B1)/(B2) being in the range of 0.1 to 100.

7. The optical element according to claim 6, wherein the optical element comprises a composite optical element in which the cured product of the optical material composition is deposited on a surface of an optical substrate by a light-curing process.

* * * * *